UNITED STATES PATENT OFFICE.

AUGUST GROSS AND AARON CHARLES HORN, OF NEW YORK, N. Y.; SAID GROSS ASSIGNOR TO SAID HORN.

WATERPROOFING COMPOUND.

No. 853,354.     Specification of Letters Patent.     Patented May 14, 1907.

Application filed November 23, 1903. Serial No. 182,402.

*To all whom it may concern:*

Be it known that we, AUGUST GROSS and AARON CHARLES HORN, citizens of the United States, residing in Manhattan borough, city of New York, in the county of New York and State of New York, have invented a certain new and useful Waterproofing Compound, of which the following is a specification.

This invention relates to a waterproofing or damp-proofing coat or paint for application to buildings and other structures, either inside or outside. Heretofore tar has been employed for such purposes, but it is well known that by the application of the necessary heat to convert it into liquid and usable form, the oils contained therein are driven off, leaving only the gum, which, upon subsequently cooling and being exposed to air, disintegrates, powders and chips. Moreover, the tar can be heated and applied only by skilled labor, and the expense is so great as to amount to a serious objection to its use.

The present invention consists of a compound which can be supplied in liquid form, and may be applied cold and by means of unskilled labor. Said compound consists of asphalt or asphaltum, mixed with sufficient pine oil to render the compound liquid, and also with sufficient linseed oil to flux the asphalt and the pine oil, Portland cement being added to render the compound better adapted for its purpose.

Preferably asphaltum of a high grade is boiled and refined, the heat required being about 400° Fahrenheit. It becomes a thick liquid, into which linseed oil is slowly poured. Then pine oil is added, and the compound is stirred until it is thoroughly mixed. The pine oil is a non-drying oil, and the compound remains liquid for a long time. Portland cement is usually added shortly before the compound is to be applied to a floor, wall or roof.

By the refining process, the asphaltum is deprived of its impurities, and as well of acids and oils. The addition of the pine oil, which is preferably distilled from the *"Pinus Australis,"* renders the compound plastic or liquid. The linseed oil favors the fluxing of the asphaltum and pine oil. One of the advantages pertaining to the use of Portland cement is that it gives the mixture body; while the other ingredients prevent breaking and cracking after application to a building.

The compound is not only damp proof, but acts as a filler for crevices or holes in the wall, floor or roof. It is recommended that the pine oil and linseed oil be in about equal proportions and form about one-fourth by weight of the compound; and also that the asphalt and Portland cement be in about equal proportions by weight, the quantity of cement being preferably less than that of asphalt. In practice, 500 pounds of asphaltum and 475 pounds of Portland cement are compounded with 120 pounds each of linseed oil and pine oil. The addition of other ingredients may be resorted to.

The compound may be applied cold, by using a suitable brush, and owing to its plastic property, it remains elastic for an indefinite length of time, and will not powder or flake. Specialists not being needed, as the compound may be applied by anybody, the cost of water-proofing is reduced considerably. Tarred felt, or other waterproofing sheeting, adheres readily to the compound after the latter is applied to a floor, wall, roof or other place, so that it is practicable to apply as many thicknesses of felt as may be desired, in alternation with coatings or layers of the compound. If desired, wall-plaster or any other mortar may be applied directly upon the compound, after the latter has set sufficiently.

The invention is not limited to the specific ingredients above set forth. Substitutes for asphaltum are coal tar, pitch, etc., either separately or mixed. Other bituminous material may be used as a base. Other oils may be used, such as fish oil or paraffin. One advantage of mixing a bituminous material with a non-drying or slow-drying oil, is that the mixture may be applied cold, and will not subsequently crack or flake. Plaster of paris or other cement may in some instances be used in place of Portland cement, although the latter is preferred. It will be understood that the materials compounded as above form a bituminous cement.

The cement does not harden or become brittle when mixed with the other ingredients of the compound, but remains plastic, and makes a waterproof filler, which is one of the principal features of my compound. When the compound is applied to a surface it remains plastic, and will not disintegrate or crack under pressure, and the film formed by the compound will stand pressure, is impervious to water and never breaks in actual use even under the severest conditions.

The compound is specially adapted for substructure work, such as the foundations and walls of the modern high office and storage buildings, underground tunnels &c. It is a well known fact that the foundations of these high buildings, where they have two or three stories below the surface of the ground, are constantly surrounded by water. The compound is specially adapted for preventing the water penetrating through the walls or foundations of these buildings. The compound is applied during the construction of the foundation, and the top of the foundation is thoroughly coated with the compound preparatory to building the walls thereon. The walls are then built up and rest on a coating or film of the compound, which does not crack or disintegrate under the great pressure and weight of the walls, and forms a thoroughly tight waterproof joint. The compound is also applied to the walls of the stories below the surface of the ground, and as the film remains plastic it will stand the pressure of the earth packed against it, and prevents the water from penetrating through the walls, thereby keeping the underground stories of the building perfectly dry.

Having thus described our invention, we claim:

1. A waterproofing fluid comprising asphalt, cement, pine oil for keeping the mixture in a fluid condition, and an oil which serves as a flux for said oil.

2. A waterproofing fluid comprising asphalt, cement and pine oil.

3. A waterproofing compound comprising asphalt, cement, pine oil and a flux.

4. A waterproofing compound comprising asphalt, cement, pine oil and linseed oil.

5. A waterproofing compound comprising asphalt and cement in about equal proportions, mixed with pine oil and linseed oil, the pine oil and linseed oil being in about equal proportions and forming about one-fourth by weight of the compound.

6. A waterproofing compound comprising asphalt and cement mixed with sufficient pine oil to render the mixture plastic, and with sufficient linseed oil to form a flux for the pine oil.

7. A waterproofing compound comprising asphalt, Portland cement, pine oil and linseed oil in the following proportions by weight: about 120 pounds of pine oil, about 120 pounds of linseed oil, about 500 pounds of asphalt, and about 475 pounds of Portland cement.

8. A waterproofing compound of asphalt, Portland cement and pine oil.

9. A waterproofing compound of asphalt, Portland cement, pine oil and linseed oil.

10. A waterproofing compound of asphalt, Portland cement, pine oil and linseed oil, the linseed oil and pine oil being in about equal proportions, and forming less than half by weight of the compound.

11. A waterproofing fluid comprising asphalt and sufficient pine oil to render the compound permanently plastic after application to a surface.

12. A waterproofing compound comprising asphalt, sufficient pine oil to render the compound permanently plastic after application to a surface, and a flux.

13. A waterproofing compound comprising asphalt, sufficient pine oil to render the compound permanently plastic after application to a surface, and linseed oil to serve as a flux.

14. A waterproofing compound comprising asphalt mixed with pine oil and linseed oil, said oils being in about equal quantities, and there being sufficient pine oil to render the compound permanently plastic after application of the compound to a surface to be waterproofed.

15. A waterproofing compound comprising asphalt, pine oil and linseed oil in the following proportions by weight: about 120 pounds of pine oil, about 120 pounds of linseed oil, and about 500 pounds of asphalt.

AUGUST GROSS.
AARON CHARLES HORN.

Witnesses:
B. C. STICKNEY,
HERMAN M. SCHOOP.